United States Patent
Hahn et al.

[19]

[11] Patent Number: 6,067,111
[45] Date of Patent: May 23, 2000

[54] SYSTEM FOR OPTICAL ACQUISITION OF THE ROAD

[75] Inventors: Stefan Hahn, Denkendorf; Fridtjof Stein, Ostfildern, both of Germany

[73] Assignee: DaimlerChrylser AG, Germany

[21] Appl. No.: 08/847,970

[22] Filed: Apr. 18, 1997

[30] Foreign Application Priority Data

Apr. 18, 1996 [DE] Germany ............................ 196 15 240

[51] Int. Cl.$^7$ ...................................................... H04N 7/18
[52] U.S. Cl. ........................... 348/148; 348/149; 340/901
[58] Field of Search ................................... 348/113, 117, 348/135, 148, 149, 159, 162; 340/435, 436, 104, 901, 904, 905, 937, 932.2; 358/108; 382/1; 365/4; H04N 7/18

[56] References Cited

U.S. PATENT DOCUMENTS

| | | | |
|---|---|---|---|
| 3,949,362 | 4/1976 | Doyle et al. | 340/104 |
| 4,214,266 | 7/1980 | Myers | 358/108 |
| 4,257,703 | 3/1981 | Goodrich | 365/4 |
| 4,277,804 | 7/1981 | Robinson | 358/108 |
| 4,433,325 | 2/1984 | Tanaka et al. | 340/937 |
| 4,447,800 | 5/1984 | Kasuya et al. | 340/904 |
| 5,359,666 | 10/1994 | Nkayama et al. | 382/1 |
| 5,574,426 | 11/1996 | Shisgal et al. | 340/435 |
| 5,646,614 | 7/1997 | Abersfelder et al. | 340/932.2 |
| 5,714,928 | 2/1998 | Sudo et al. | 340/436 |
| 5,754,100 | 5/1998 | Park | 340/435 |

FOREIGN PATENT DOCUMENTS

| | | |
|---|---|---|
| 0 361 914 A2 | of 1989 | European Pat. Off. . |
| 0361914A2 | 9/1989 | European Pat. Off. . |
| 0 527 665 A1 | of 1992 | European Pat. Off. . |
| 3726065A1 | 1/1988 | Germany . |
| 63-284409 | 11/1988 | Japan . |

*Primary Examiner*—Howard Britton
*Assistant Examiner*—Tung Vo
*Attorney, Agent, or Firm*—Evenson, McKeown, Edwards & Lenahan, P.L.L.C.

[57] ABSTRACT

In a system for optical acquisition of the road and traffic in front of a road vehicle by electronic processing and evaluation of the image signals from a video camera mounted at the level of the top edge of the windshield of the vehicle, with the optical axis of the camera running at an angle to the road in a plane that is parallel to or approximately parallel to the vertical lengthwise central plane of the vehicle, the lens of the video camera is designed as a wide-angle lens and the slope angle that the optical axis of the lens forms with the plane of the road is less than half the total aperture angle of the lens, but corresponds approximately to half of its value.

10 Claims, 3 Drawing Sheets

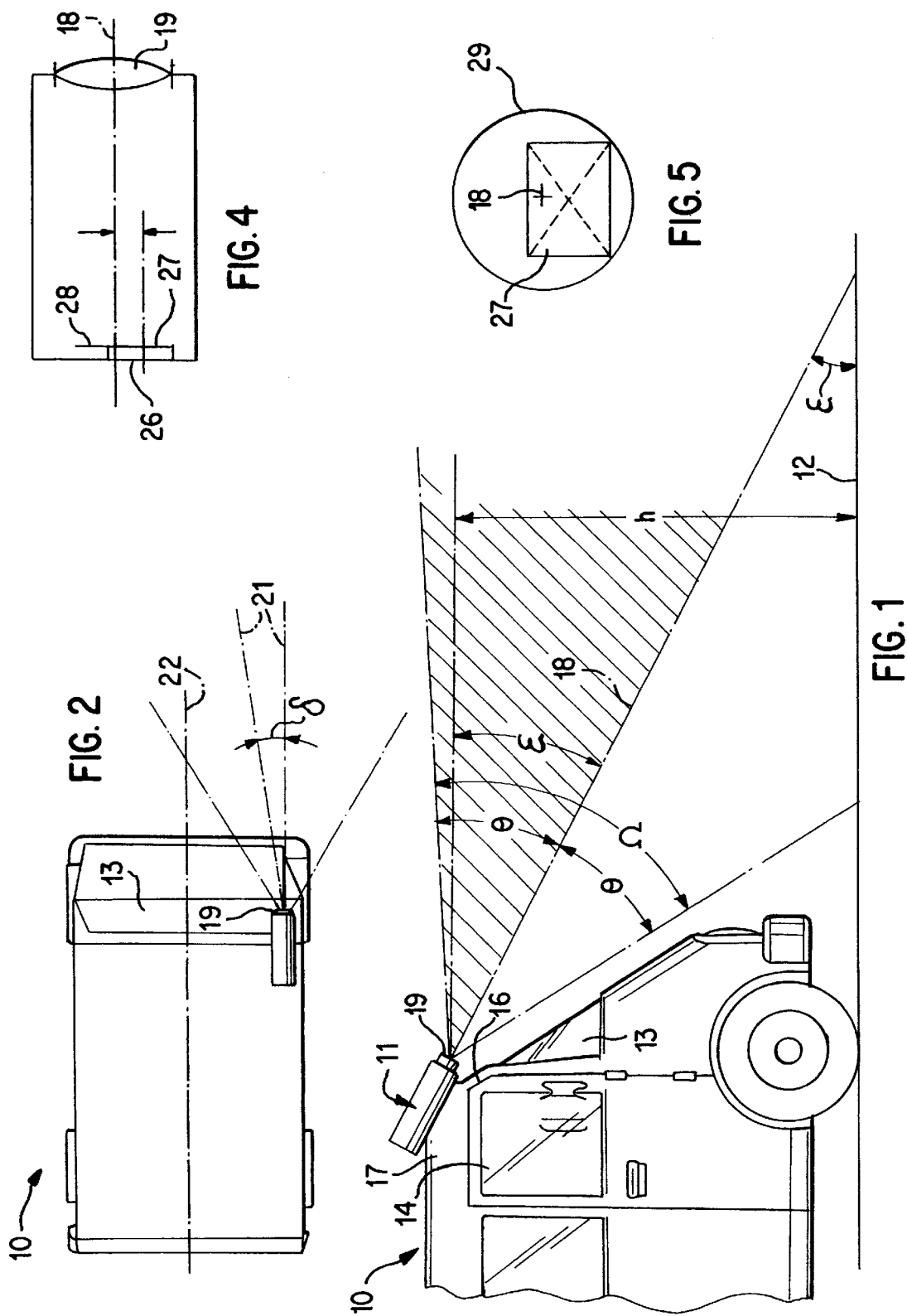

SYSTEM FOR OPTICAL ACQUISITION OF THE ROAD

This application claims the priority of German priority document 196 15 240.2, the disclosure of which is expressly incorporated by reference herein.

BACKGROUND AND SUMMARY OF THE INVENTION

The invention relates to a device for optical detection of the road and traffic from a road vehicle, by electronic processing and evaluation of the image signals from a video camera mounted in an elevated part of the vehicle (for example at the level of the top edge of the windshield of the vehicle), with the slope angle E that the optical axis of the camera lens forms with the plane of the road being less than, but approximately equal to, half the total aperture angle (2θ) of the lens.

A known system of this kind, disclosed in European Patent Application 89 309 876.4 (publication number 0 361 914 A2), determines the path of the road edges by detecting sections of straight lines in the image generated by the video camera, which edges converge with increasing distance from the vehicle. Systems of this kind that permit rapid "real time" image processing are used for example as "doze alarms" that trigger a warning signal for the driver if the vehicle's orientation relative to the road deviates from the desired values. Theoretically, such a system also permits intervention in the power steering of the vehicle to maintain an orientation relative to the road and the vehicle's position on the road if the driver fails to react, and makes it possible to control automatic braking and stopping of the vehicle, as well.

The effectiveness with which these functions can be fulfilled improves as the distance from the vehicle at which the road is "seen" decreases, and as the distance at which the road can be detected with sufficient position resolution increases. These current requirements, to achieve the best possible compromise, can be met, but not satisfactorily, by using a camera with a lens having an average viewing angle that is slightly smaller than that of a normal lens. Better results, but by no means satisfactory, can be achieved at the price of a considerable increase in cost, by using two video cameras, one of which is associated with the near field in front of the vehicle and is fitted with a wide-angle lens, and the other of which is associated with the distant range and is equipped with a telephoto lens.

Hence, the goal of the present invention is to provide an improved system of the type described above which can achieve a position resolution for image evaluation in both the extreme near range of the vehicle and also in areas on the road that are relatively distant, using a single video camera.

This goal is achieved according to the invention by providing the video camera with a wide-angle lens whose aperture angle (2θ) is at least 6°, and by positioning the photosensitive sensor area of the video camera to receive that part of the image which corresponds to a distance range that is between a certain minimum distance from the camera and the farthest distant areas of the acquired area. In the system according to the invention, the imaging scale for areas far from the vehicle is larger by a factor M than it is for areas close to the vehicle. A value of M can be calculated by means of the following expression:

$$M = 1 + \tan^2 \epsilon$$

in which $\epsilon$ designates the slope angle of the optical axis of the camera lens relative to the road. (The value of M thus calculated is somewhat smaller than the value which is yielded by an alternative method described hereinafter.)

Thus, the camera lens exhibits the imaging properties of a telephoto lens for portions of the acquired area that are distant from the vehicle and exhibits the image-field widening properties of a wide-angle lens only for the area that is close to the vehicle. By allocating the photosensitive sensor area of the video camera to that part of the image that corresponds to a distance range from a preset minimum to the far distant portions of the acquired area, the (limited) image resolution of the photosensitive sensor area of the CCD camera can be used optimally for the surveillance of areas of interest.

If the aperture angle of the lens is at least 90°, the lens can be set with its optical axis inclined 45° or more relative to the road. Thus, the imaging scale M for the distant areas of the road is larger by a factor of 2 than in the near area. Because the imaging scale depends on the square of the tangent of slope angle $\epsilon$, the enlargement of the imaging scale is especially efficient when this slope angle $\epsilon$ is chosen to be larger than 45°, which is quite feasible even with wide-angle lenses having wide angle characteristics which need not be considered extreme. In commercial vehicles with a tall cab in which the front end of the vehicle is essentially defined by the vertical or approximately vertical plane of the windshield, the use of a camera lens with a total aperture angle of 90° allows the camera to be mounted in the interior of the cab, and nevertheless to acquire the road over nearly its entire length between the vehicle and the horizon.

In addition, it is advantageous for the horizontal minimum distance from the camera lens (at which the latter casts the image of the acquired area on the photosensitive surface of the camera) to be approximately equal to the value h/tan$\epsilon$, where h is the vertical distance of the center of the lens from the road and $\epsilon$ is once again the slope angle that the optical axis of the lens forms with the road.

Other objects, advantages and novel features of the present invention will become apparent from the following detailed description of the invention when considered in conjunction with the accompanying drawings.

BRIEF DESCRIPTION OF THE DRAWINGS

FIG. 1 is a simplified schematic side view of a system according to the invention for optical detection of the road and traffic in front of a road vehicle, with a video camera mounted at the level of the top edge of the windshield of the vehicle;

FIG. 2 shows the system according to FIG. 1 in a top view;

FIG. 4 is a schematically simplified representation of the arrangement of the photosensitive sensor area of the video camera in the system according to FIGS. 1 and 2;

FIG. 5 is a view of the photosensitive sensor area of the video camera in the system, looking in the direction of arrow V in FIG. 4.

DETAILED DESCRIPTION OF THE DRAWINGS

Figure 3:
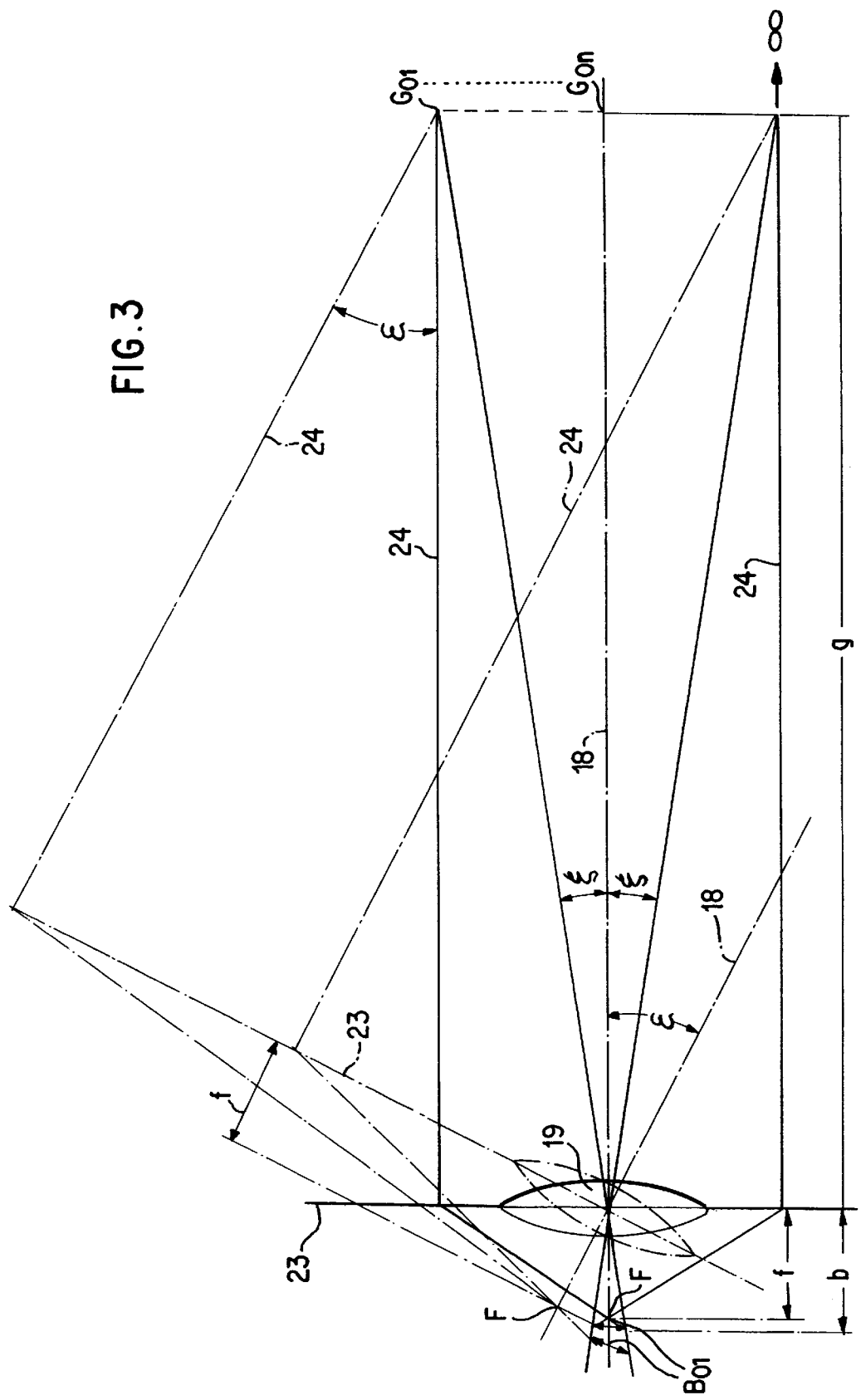
FIG. 3 is an imaging beam path explaining the function of the video camera in the system according to FIGS. 1 and 2.

The road vehicle 10 in FIG. 1 (shown as a van) is equipped with a video camera 11, whose image angle $\Omega=2\theta$ is subtended by an area of road 12 that begins at a short distance in front of the front end of the vehicle and extends to great distances, for example into "infinity."

The video camera 11 is mounted near the upper right corner of windshield 13 of vehicle 10, outside the passenger compartment 14, at a place where the right-hand upper supporting member 16 is connected to the front right corner area of vehicle roof 17. The vertical distance h of video camera 11 from road 12 thus corresponds approximately to the height of the vehicle.

The video camera is mounted on vehicle 10 with the optical axis 18 of the camera lens 19 inclined to the plane of road 12 at an acute angle $\epsilon$, in a vertical plane 21 (FIG. 2) which is parallel to the vertical lengthwise central plane 22 of vehicle 10.

In another advantageous orientation of video camera 11 indicated by the dashed line in FIG. 2, the vertical plane 21 containing the inclined path of the optical axis 18 of lens 19, forms with the lengthwise central plane 22 of vehicle 10, a small acute angle $\delta$ of only a few degrees. This orientation moves the limit of the near range of the camera on the side of the road on which opposing traffic is moving, closer to vehicle 10. Such a "diagonal" orientation of the camera is of course not required; also, it is not provided when the latter is located in the center of the vehicle, for example in front of the rear-view mirror of the vehicle mounted at the top edge of the windshield. (A modern video camera of small dimensions can even integrate into the rear view mirror mount.)

Furthermore, camera 11 is mounted on vehicle 10 so that the angle $\epsilon$ of optical axis 18 of camera lens 19 is a few degrees smaller (for example 2 to 5°) than half of the camera aperture angle $2\theta$, so that video camera 11, at least beyond a certain minimum distance from vehicle 10, can detect vehicles in front of the vehicle, in their full height, even if they are taller than vehicle 10.

So that the boundary of the area of the road that can be scanned by camera 11 is as close as possible to vehicle 10 with the given orientation of optical axis 18 of camera lens 19, camera lens 19 is designed as a wide-angle lens, with an aperture angle $2\theta$ that is assumed to have a value of 60° for the purpose of explanation. Thus, with a vehicle height of approximately 2 meters, and a slope angle $\epsilon$ of optical axis 18 of about 28°, the road area that can be acquired by means of camera 11, taking into account the format limitation provided by camera 11, extends about 4 meters forward of the camera 11, to the "elevated" horizon within image angle $2\theta$.

For the following explanation of further structural details and functional properties of video camera 11, it is assumed for the sake of simplicity that the geometric and optical properties of lens 19 can be described by an imaging equation of the simplified form:

$$1/g + 1/b = 1/f \qquad (1)$$

in which, as shown in FIG. 3, f is the focal length of lens 19 (represented by a single plane, the so-called principal plane 23) while g is the object distance (defined as the distance of an object point $G_{01}$ detected by lens 19 from the principal plane 23), and b represents the image distance (defined as the distance from principal plane 23 to the image point $B_{01}$ cast by the lens as a function of the object point). The focal distance f is the distance (along optical axis 18) from the principal plane 23 to the focus F, through which pass all of the light beams 24 from the imageable object, that strike the principal plane 25 parallel to the optical axis 18 of lens 19.

With these assumptions, the image points $B_{0n}$ corresponding to those points $G_{0n}$ in the area that lie above optical axis 18 of lens 19 (as viewed along the latter) fall into the area of the critical image circle (FIG. 5) that is located below optical axis 18. Because of the inclined arrangement provided for video camera 11 on vehicle 10 (shown by the dashed lines in FIG. 1), practically the entire acquired area important for observation is located (in the above sense) above the optical axis 18 of lens 19. Therefore, as shown in the schematically simplified representation in FIG. 4, the photosensitive CCD sensor plate 26 (whose sensor area 27 on the lens side lies in a selected image plane 28 perpendicular to the optical axis 18 of lens 19, and defines by its dimensions the area within image circle 29 of FIG. 5 that can be evaluated) is displaced sufficiently downward so that the predominant part of the image format is utilized for the area that is of interest in image evaluation.

Because of the diagonal positioning of video camera 11 relative to road 12, those portions of the road that are farther away from vehicle 10 will be imaged on radially outer (in other words lower) eccentrically situated portions of sensor area 27 than the parts of the road that are located closer to vehicle 10. As a result, the areas of road 12 that are located farther away will be imaged with a larger imaging scale than the areas that are located closer in, which are imaged on the portion of sensor plate 26 that is close to optical axis 18 of the lens. Based on the above simplified imaging equation (a), compared with a horizontal arrangement of video camera 11 (a horizontal path of optical axis 18), the imaging scale with an inclined path of optical axis 18 is larger by a scale factor M that is given by the relationship $$M = \frac{1 + \tan^2 \epsilon}{1 - \tan\epsilon\tan\vartheta} \qquad (2)$$

in which $\epsilon$ is the slope angle of optical axis 18 of video camera 11 and $\vartheta$ is half the image angle at which, with a horizontally oriented optical axis 18 and a preset object distance g, an object represented in FIG. 3 by a double arrow 31 would appear to have an extent that was the same on both sides of the optical axis.

For a qualitative discussion of the operation of the system according to the invention, reference will now be made to FIGS. 6a and 6b, which show the area of a road 31 that runs straight in one plane, and can be acquired by sensor plate 26 of video camera 11. An obstacle 32 is located in the road 31, but still at a great distance.

Figure 6B:
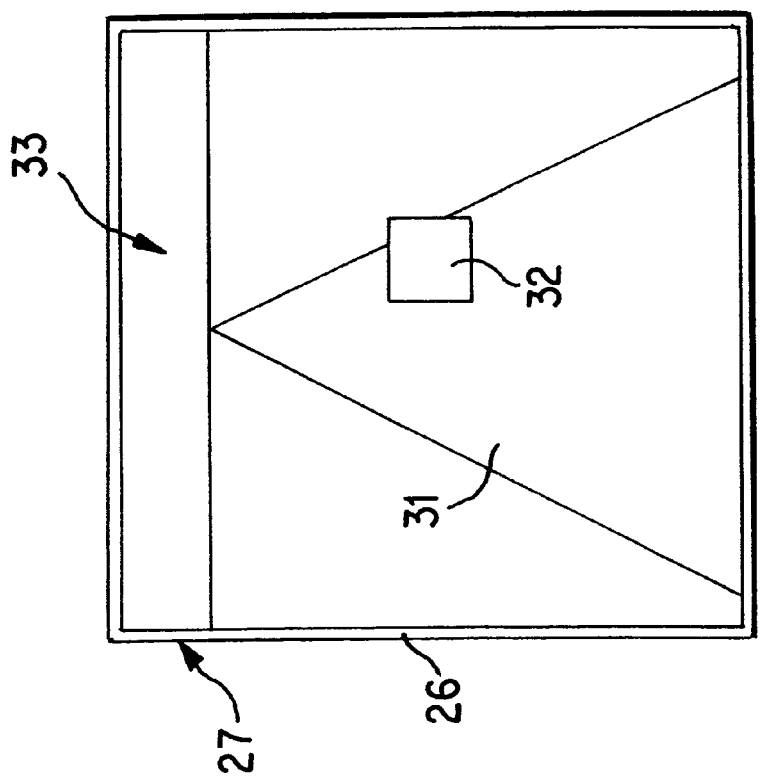
FIGS. 6a and 6b are schematically simplified representations explaining the function of the system according to FIGS. 1 and 3.
Figure 6A:
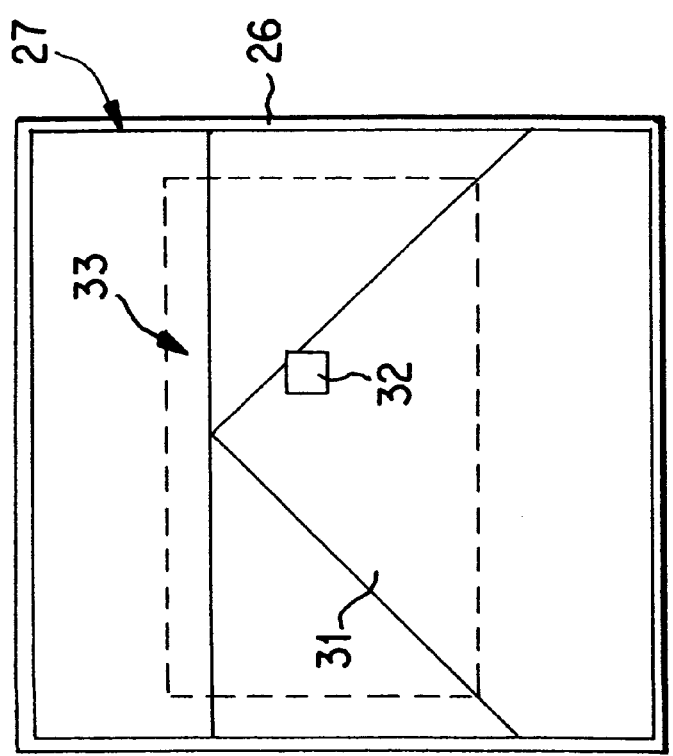

FIG. 6a corresponds to the case in which video camera 11 is fitted with a normal lens, while FIG. 6b shows the case when video camera 11 is fitted with a wide-angle lens and is used in the system described in FIGS. 1, 3, and 4. The image according to FIG. 6b, for whose evaluation the entire sensor area 27 of sensor plate 26 can be used, then corresponds to an enlarged representation of the image section 33 enclosed by dashed lines in FIG. 6a. The resultant distortion "lengthwise of the road" is insignificant for electronic image evaluation. The relatively high magnification of distant objects, for example obstacle 32, is advantageous for example for being able to recognize the back of a traffic jam in proper time.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Device for detecting a road and objects therein in an area of interest near a vehicle, by means of electronic signals from a video camera mounted on an elevated part of said vehicle, wherein:

said camera is oriented so that an optical axis of a camera lens thereof forms a slope angle relative to a plane of said road, which slope angle is less than but approximately equal to one half of an aperture angle of said camera lens;

said camera lens is a wide angle lens with an aperture angle greater than approximately sixty degrees; and said camera has a photosensitive detector element which is situated in an eccentric portion of an image area of said camera lens, which portion of said image area lies approximately between said optical axis of said camera lens and a part of said image area which corresponds to a farthest edge of area of interest.

2. Device according to claim 1 wherein said wide angle lens has an aperture angle greater than approximately ninety degrees.

3. System according to claim 2 wherein said predetermined minimum distance is approximately equal to the value h/tanε, where h is vertical distance of the center of lens from road and ε is the slope angle that the optical axis of the camera lens forms with the plane of the road.

4. System according to claim 1 wherein said predetermined minimum distance is approximately equal to the value h/tanε, where h is vertical distance of the center of lens from road and ε is the slope angle that the optical axis of the camera lens forms with the plane of the road.

5. The device according to claim 1, wherein said optical axis of said camera lens is pointed in a direction which corresponds approximately to an edge of said area of interest nearest said vehicle.

6. A camera for detecting a road and objects therein in an area of interest near of a vehicle, said camera comprising:

a wide angle lens having an aperture angle greater than ninety degrees; and a photosensitive detector element which is mounted off center in an image area of said lens, in a portion of said image area such that, when said camera is mounted on said vehicle with an optical axis of said lens forming an angle with a plane of said road which is less than but approximately equal to one half of said aperture angle, said portion lies approximately between said optical axis of said lens and a part of said image area which corresponds to a farthest edge of said area of interest.

7. Method for detecting a road and objects in an area of interest near a vehicle, comprising:

providing a video camera mounted on said vehicle, said camera having a wide angle lens and a photodetector disposed in an image area of said wide angle lens;

fixing a mounting direction of said camera on said vehicle such that an optical axis of said wide angle lens is directed approximately toward an edge of said area of interest which edge is nearest said vehicle, so that said area of interest lies in an eccentric portion of a field of view of said lens, approximately from said optical axis to an edge of said field of view;

processing signals from said photodetector in an eccentric portion of said image area corresponding to said area of interest to identify said road and objects in said area of interest.

8. The method according to claim 7 wherein in said step of providing a video camera, said photodetector is provided in an eccentric portion of said image area which corresponds to said area of interest.

9. Apparatus for detecting a road and objects in an area of interest near a vehicle, comprising:

a video camera mounted on said vehicle for detecting objects in said area of interest;

a wide angle lens on said video camera, providing an optical image area in said camera; and a photodetector in said video camera, disposed in said image area;

wherein said video camera is mounted on said vehicle with an optical axis of said wide angle lens oriented in a direction which points approximately at an edge of said area of interest which edge is nearest said vehicle, so that said area of interest lies in an eccentric portion of a field of view of said lens, approximately from said optical axis to an edge of said field of view.

10. The apparatus according to claim 9 wherein said photodetector is disposed in an eccentric portion of said image area which corresponds to said area of interest.

* * * * *